(No Model.)
C. G. & R. L. SHORT.
TELETHERMOMETER.
No. 443,872. Patented Dec. 30, 1890.
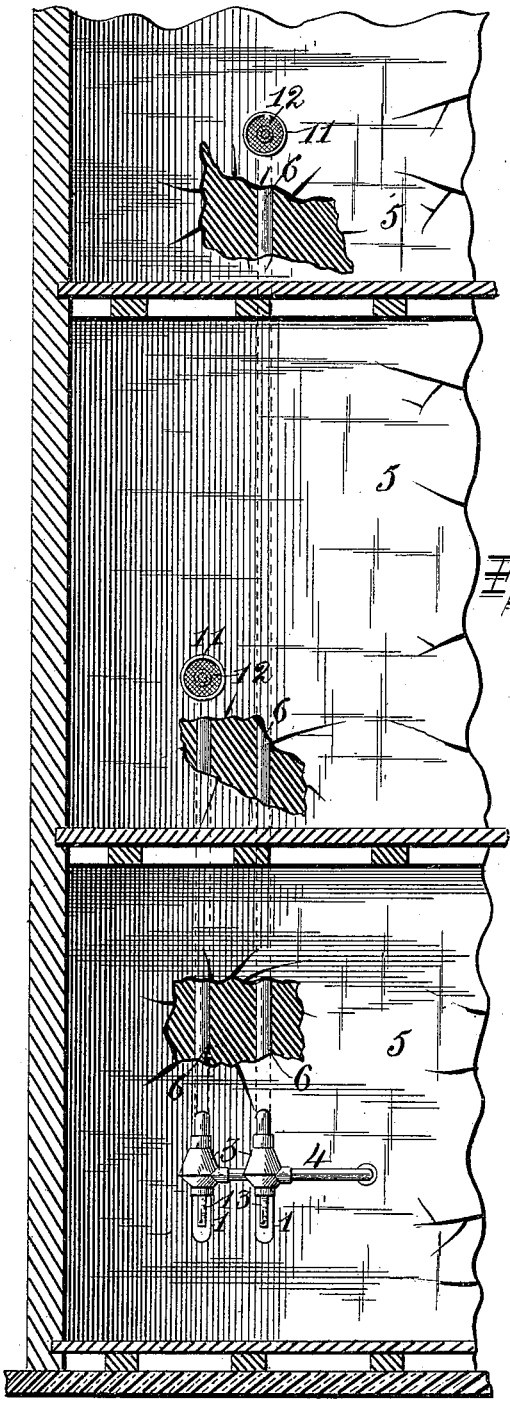
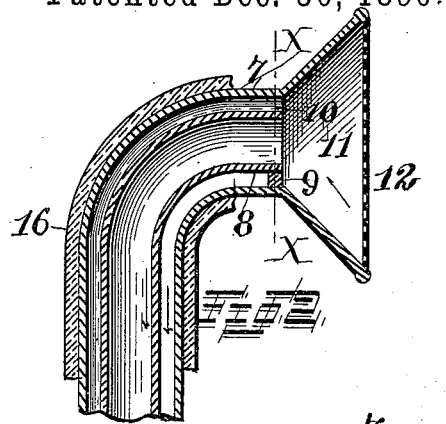
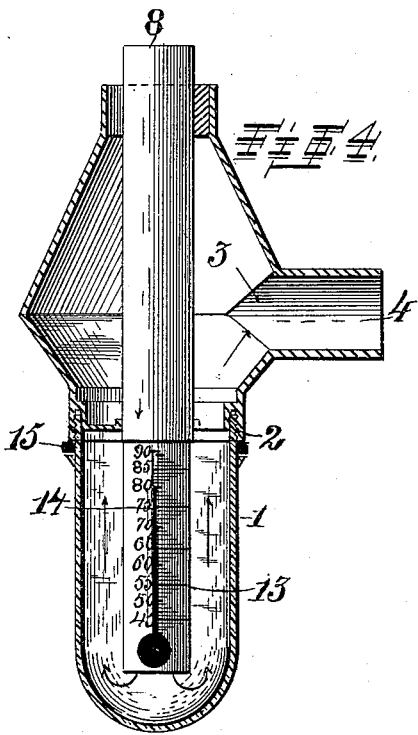

UNITED STATES PATENT OFFICE.

CHARLES G. SHORT AND ROBERT L. SHORT, OF ST. LOUIS, MISSOURI; SAID CHARLES G. SHORT ASSIGNOR TO SAID ROBERT L. SHORT.

TELETHERMOMETER.

SPECIFICATION forming part of Letters Patent No. 443,872, dated December 30, 1890.

Application filed March 22, 1890. Serial No. 345,007. (No model.)

*To all whom it may concern:*

Be it known that we, CHARLES G. SHORT and ROBERT L. SHORT, of St. Louis, in the State of Missouri, have invented certain new and useful Improvements in Distant-Temperature Indicators, of which the following is a full, clear, and exact description.

Our invention has for its object to provide a novel and simplified construction in a device for indicating the temperature of distant apartments, which embodies improvements over Letters Patent granted to Charles G. Short, No. 375,208, dated December 20, 1887.

It consists in inducing currents of air through suitable conducting-tubes, one of which is placed within the other, the outer pipe being of sufficient size to admit a current of air passing between the pipes, forming insulation for the inner pipe, said inner pipe conveying air to a transparent tube containing a thermometer, and a suitable source of draft whereby the air in both tubes is continually drawn, and other details in the construction, as will be hereinafter described.

Reference is had to the accompanying drawings, in which—

Figure 1 represents a complete device for carrying out our invention as being applied to a building. Fig. 2 is a vertical transverse section of the end of a conductor that forms a part of the device. Fig. 3 is a horizontal section taken on line $x$ $x$ of Fig. 2, and Fig. 4 is a vertical section of the gathering-chamber with jar and thermometer attached.

Referring to the drawings, 1 represents a jar of a transparent nature, having preferably a rounded extremity and formed upon its edge screw-threads 2, which threads are turned into corresponding threads formed on end of gathering-chamber 3.

The gathering-chamber 3 has a pipe or outlet 4, leading to a chimney, fan, or other source of draft. Connected to said chamber and extending therefrom to the room 5 of the building is a conductor 6. This conductor consists of an outer pipe 7 and an inner pipe 8, separated by small lugs or points 9. The object of the outer pipe 7 is to form the outside chamber 10, through which a current of air is conducted from the room for the purpose of insulating and tempering the inner pipe 8. The outside pipe 7 is preferably provided with a funnel-shaped receiver 11 and a shield 12, of wire-gauze or other analogous material. Attached to one end of the inner pipe 8 is a transparent tube 13, containing a thermometer 14, which registers or indicates the temperature of room from which the pipes lead. The outer pipe 7, through which the air passes for the purpose of insulating and tempering, as above stated, leads to and is secured to the gathering-chamber 3. Between the jar 11 and the gathering-chamber 3 is an elastic ring or packing 15 for the purpose of forming an air-tight connection. Surrounding the outer pipe 7 is placed non-conducting material 16 for the purpose of further insulation. By means of the draft a current of air is induced to enter the receiver 11. From thence the current is divided into two, one of which is drawn through the space 10, for the purpose of insulating and tempering the material of which the inner pipe is made, to the receiver 3 and source of draft 4. The inner current passes through pipe 8 and transparent tube 13, over thermometer 14, into jar 1, and thence to gathering-chamber and source of draft. It is evident that the construction may be varied in some of its arrangements without departing from the nature of our invention.

Having thus fully described our invention, what we claim, and desire to cover by Letters Patent, is—

1. The improved device for indicating the temperature of distant apartments, comprising two concentric open air-passages through which a current of air continuously passes, the innermost of said passages being surrounded by and separated from the outermost passage and the open ends of both passages communicating with, respectively, the same apartment and a source of draft, and a thermometer inclosed but visible in said innermost air-passage at a point remote from the apartment, substantially as specified.

2. The method of indicating the temperature of distant apartments, which consists in simultaneously withdrawing two separate concentric currents of air from one apartment and measuring the temperature of the inner current, substantially as herein specified.

3. The method of indicating the temperature of distant apartments, which consists in simultaneously conducting concentric currents of air from the same apartment, the outermost of said currents directly to a source of draft, taking the temperature of the innermost current at a point remote from said apartment, and finally discharging said innermost current into a source of draft, substantially as specified.

4. The combination, with two open concentric tubes 7 and 8, having free passages therethrough, each of said tubes having an entrance-opening communicating with a single apartment the temperature of which is to be taken, of a transparent jar connected with both tubes and with a source of draft, the said inner tube having a transparent portion within the said jar, and a thermometer located within the transparent portion of the inner tube, substantially as specified.

In testimony whereof we affix our signatures in presence of two witnesses.

CHARLES G. SHORT.
ROBERT L. SHORT.

Witnesses:
C. F. KELLER,
JNO. C. HIGDON.